Figure 1:
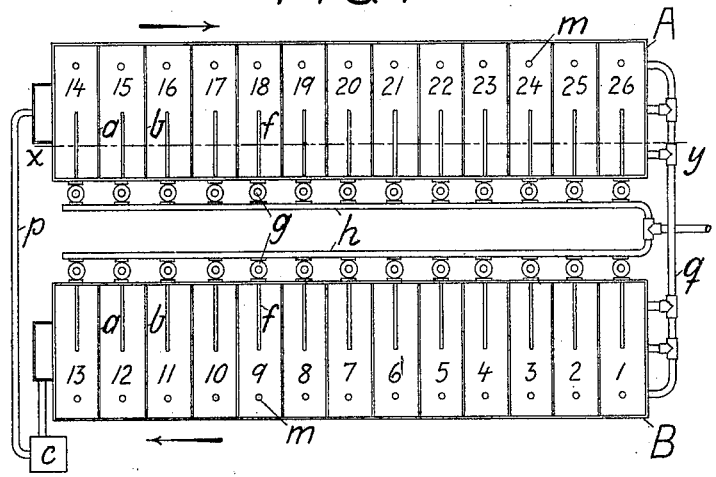

No. 805,025. PATENTED NOV. 21, 1905.
N. F. NISSEN.
PASTEURIZING APPARATUS.
APPLICATION FILED OCT. 3, 1903.

3 SHEETS—SHEET 1.

Witnesses.
Paul A Talbot
C. Ward Higgins

Inventor.
Niels Frederick Nissen
by H. L. Reynolds.
his atty.

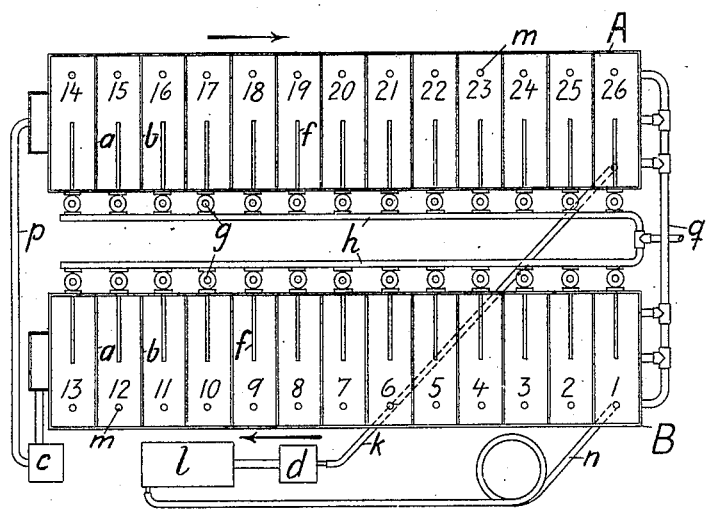
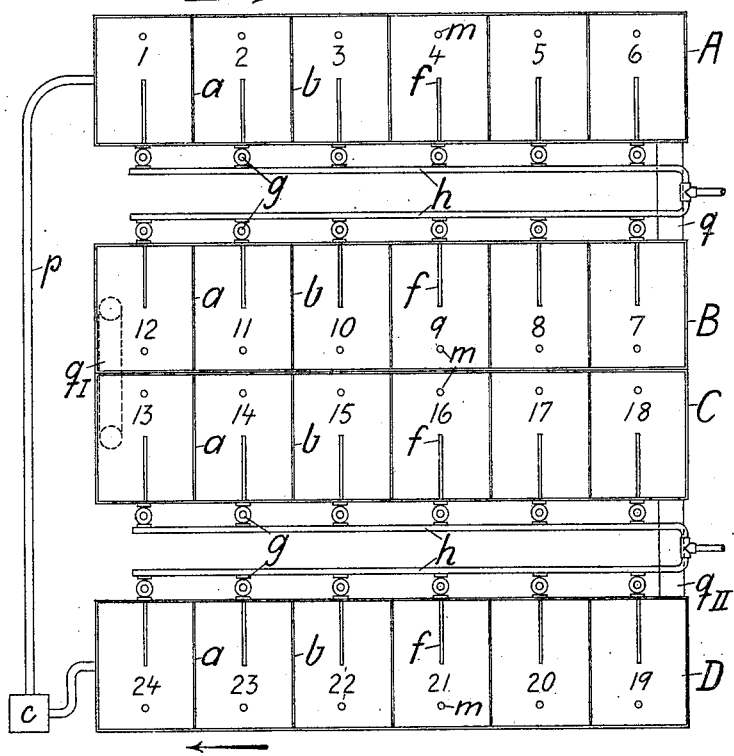

No. 805,025. PATENTED NOV. 21, 1905.
N. F. NISSEN.
PASTEURIZING APPARATUS.
APPLICATION FILED OCT. 3, 1903.

3 SHEETS—SHEET 3.

Fig. 6.

Table of Manipulation for Pasteurising Apparatus

Compartment Number

| Time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| 7am | 20° | 23° | 26° | 31° | 35° | 39° | 43° | 47° | 52° | 57° | 60° | 60° | 60° | 60° | 60° | 60° | 57° | 52° | 47° | 43° | 39° | 35° | 31° | 26° | 23° | 20° |
| 7:05 | 20 | 20 | 23 | 26 | 31 | 35 | 39 | 43 | 47 | 52 | 57 | 60 | 60 | 60 | 60 | 60 | 60 | 57 | 52 | 47 | 43 | 39 | 35 | 31 | 26 | 23 |
| 7:10 | 23 | 20 | 20 | 23 | 26 | 31 | 35 | 39 | 43 | 47 | 52 | 57 | 60 | 60 | 60 | 60 | 60 | 60 | 57 | 52 | 47 | 43 | 39 | 35 | 31 | 26 |
| 7:15 | 26 | 23 | 20 | 20 | 23 | 26 | 31 | 35 | 39 | 43 | 47 | 52 | 57 | 60 | 60 | 60 | 60 | 60 | 60 | 57 | 52 | 47 | 43 | 39 | 35 | 31 |
| 7:20 | 31 | 26 | 23 | 20 | 20 | 23 | 26 | 31 | 35 | 39 | 43 | 47 | 52 | 57 | 60 | 60 | 60 | 60 | 60 | 60 | 57 | 52 | 47 | 43 | 39 | 35 |
| 7:25 | 35 | 31 | 26 | 23 | 20 | 20 | 23 | 26 | 31 | 35 | 39 | 43 | 47 | 52 | 57 | 60 | 60 | 60 | 60 | 60 | 60 | 57 | 52 | 47 | 43 | 39 |
| 7:30 | 39 | 35 | 31 | 26 | 23 | 20 | 20 | 23 | 26 | 31 | 35 | 39 | 43 | 47 | 52 | 57 | 60 | 60 | 60 | 60 | 60 | 60 | 57 | 52 | 47 | 43 |
| 7:35 | 43 | 39 | 35 | 31 | 26 | 23 | 20 | 20 | 23 | 26 | 31 | 35 | 39 | 43 | 47 | 52 | 57 | 60 | 60 | 60 | 60 | 60 | 60 | 57 | 52 | 47 |
| 7:40 | 47 | 43 | 39 | 35 | 31 | 26 | 23 | 20 | 20 | 23 | 26 | 31 | 35 | 39 | 43 | 47 | 52 | 57 | 60 | 60 | 60 | 60 | 60 | 60 | 57 | 52 |
| 7:45 | 52 | 47 | 43 | 39 | 35 | 31 | 26 | 23 | 20 | 20 | 23 | 26 | 31 | 35 | 39 | 43 | 47 | 52 | 57 | 60 | 60 | 60 | 60 | 60 | 60 | 57 |
| 7:50 | 57 | 52 | 47 | 43 | 39 | 35 | 31 | 26 | 23 | 20 | 20 | 23 | 26 | 31 | 35 | 39 | 43 | 47 | 52 | 57 | 60 | 60 | 60 | 60 | 60 | 60 |
| 7:55 | 60 | 57 | 52 | 47 | 43 | 39 | 35 | 31 | 26 | 23 | 20 | 20 | 23 | 26 | 31 | 35 | 39 | 43 | 47 | 52 | 57 | 60 | 60 | 60 | 60 | 60 |
| 8:00 | 60 | 60 | 57 | 52 | 47 | 43 | 39 | 35 | 31 | 26 | 23 | 20 | 20 | 23 | 26 | 31 | 35 | 39 | 43 | 47 | 52 | 57 | 60 | 60 | 60 | 60 |
| 8:05 | 60 | 60 | 60 | 57 | 52 | 47 | 43 | 39 | 35 | 31 | 26 | 23 | 20 | 20 | 23 | 26 | 31 | 35 | 39 | 43 | 47 | 52 | 57 | 60 | 60 | 60 |
| 8:10 | 60 | 60 | 60 | 60 | 57 | 52 | 47 | 43 | 39 | 35 | 31 | 26 | 23 | 20 | 20 | 23 | 26 | 31 | 35 | 39 | 43 | 47 | 52 | 57 | 60 | 60 |
| 8:15 | 60 | 60 | 60 | 60 | 60 | 57 | 52 | 47 | 43 | 39 | 35 | 31 | 26 | 23 | 20 | 20 | 23 | 26 | 31 | 35 | 39 | 43 | 47 | 52 | 57 | 60 |
| 8:20 | 60 | 60 | 60 | 60 | 60 | 60 | 57 | 52 | 47 | 43 | 39 | 35 | 31 | 26 | 23 | 20 | 20 | 23 | 26 | 31 | 35 | 39 | 43 | 47 | 52 | 57 |
| 8:25 | 57 | 60 | 60 | 60 | 60 | 60 | 60 | 57 | 52 | 47 | 43 | 39 | 35 | 31 | 26 | 23 | 20 | 20 | 23 | 26 | 31 | 35 | 39 | 43 | 47 | 52 |
| 8:30 | 52 | 57 | 60 | 60 | 60 | 60 | 60 | 60 | 57 | 52 | 47 | 43 | 39 | 35 | 31 | 26 | 23 | 20 | 20 | 23 | 26 | 31 | 35 | 39 | 43 | 47 |
| 8:35 | 47 | 52 | 57 | 60 | 60 | 60 | 60 | 60 | 60 | 57 | 52 | 47 | 43 | 39 | 35 | 31 | 26 | 23 | 20 | 20 | 23 | 26 | 31 | 35 | 39 | 43 |
| 8:40 | 43 | 47 | 52 | 57 | 60 | 60 | 60 | 60 | 60 | 60 | 57 | 52 | 47 | 43 | 39 | 35 | 31 | 26 | 23 | 20 | 20 | 23 | 26 | 31 | 35 | 39 |
| 8:45 | 39 | 43 | 47 | 52 | 57 | 60 | 60 | 60 | 60 | 60 | 60 | 57 | 52 | 47 | 43 | 39 | 35 | 31 | 26 | 23 | 20 | 20 | 23 | 26 | 31 | 35 |
| 8:50 | 35 | 39 | 43 | 47 | 52 | 57 | 60 | 60 | 60 | 60 | 60 | 60 | 57 | 52 | 47 | 43 | 39 | 35 | 31 | 26 | 23 | 20 | 20 | 23 | 26 | 31 |
| 8:55 | 31 | 35 | 39 | 43 | 47 | 52 | 57 | 60 | 60 | 60 | 60 | 60 | 60 | 57 | 52 | 47 | 43 | 39 | 35 | 31 | 26 | 23 | 20 | 20 | 23 | 26 |
| 9:00 | 26 | 31 | 35 | 39 | 43 | 47 | 52 | 57 | 60 | 60 | 60 | 60 | 60 | 60 | 57 | 52 | 47 | 43 | 39 | 35 | 31 | 26 | 23 | 20 | 20 | 23 |
| 9:05 | 23 | 26 | 31 | 35 | 39 | 43 | 47 | 52 | 57 | 60 | 60 | 60 | 60 | 60 | 60 | 57 | 52 | 47 | 43 | 39 | 35 | 31 | 26 | 23 | 20 | 20 |
| 9:10 | 20 | 23 | 26 | 31 | 35 | 39 | 43 | 47 | 52 | 57 | 60 | 60 | 60 | 60 | 60 | 60 | 57 | 52 | 47 | 43 | 39 | 35 | 31 | 26 | 23 | 20 |
| 9:15 | 20 | 20 | 23 | 26 | 31 | 35 | 39 | 43 | 47 | 52 | 57 | 60 | 60 | 60 | 60 | 60 | 60 | 57 | 52 | 47 | 43 | 39 | 35 | 31 | 26 | 23 |
| 9:20 | 23 | 20 | 20 | 23 | 26 | 31 | 35 | 39 | 43 | 47 | 52 | 57 | 60 | 60 | 60 | 60 | 60 | 60 | 57 | 52 | 47 | 43 | 39 | 35 | 31 | 26 |

Witnesses.
Paul A Talbot
Ward Higgins

Inventor.
Niels Frederick Nissen
by H. L. Reynolds.
his atty.

UNITED STATES PATENT OFFICE.

NIELS FREDERIK NISSEN, OF COPENHAGEN, DENMARK.

PASTEURIZING APPARATUS.

No. 805,025.  Specification of Letters Patent.  Patented Nov. 21, 1905.

Application filed October 3, 1903. Serial No. 175,695.

*To all whom it may concern:*

Be it known that I, NIELS FREDERIK NISSEN, engineer, of 16 Aaboulevard, Copenhagen, Denmark, have invented Improvements in Pasteurizing Apparatus, of which the following is a specification.

This invention relates to apparatus for pasteurizing beer and other liquids and will be described with reference to the accompanying drawings, wherein—

Figure 2:
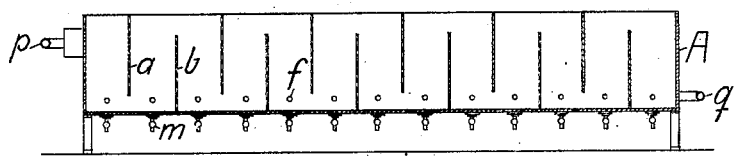
Figure 3:
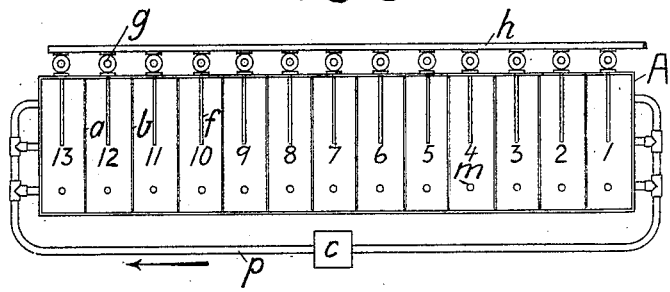

Figure 1 shows the apparatus in plan, and Fig. 2 shows one of the tanks in longitudinal vertical section on line $x\,y$ of Fig. 1. Fig. 3 shows the apparatus provided with a special cooling device. Fig. 4 represents the device in the form of two tanks side by side. Fig. 5 shows the device in the form of several tanks side by side, and Fig. 6 is a table illustrating the temperature for different compartments at different times.

The apparatus consists of two tanks A and B, connected at the one end by a pipe $q$ and at the other end by a pipe $p$ and a pump $c$. Each of the tanks A and B is divided into a considerable number of compartments by means of transverse vertical and alternating partitions $a$ and $b$, the partitions $a$ extending from the top down to a short distance from the bottom of the box and those marked $b$ from the bottom to a short distance from the top of the chamber. Thirteen such compartments are shown. Each of the compartments is provided with a steam-inlet pipe $f$, through which steam can be led into the compartment from the steam-conduit $h$ by opening the steam-valve $g$, placed outside of the chamber.

$m$ is an outlet-cock placed in the bottom of each compartment.

In preparing the apparatus for use it is filled with cold water until the water stands about an inch above the partitions marked $b$ or those extending upward from the bottom. The water is then heated to different degrees in the different compartments by means of the steam-pipes. A number of the compartments (generally six) are heated to the pasteurizing temperature, and the compartments on both sides of these are heated to different degrees on a gradually-reduced scale, the temperature of the compartments nearest the hot compartments being highest, and the farther the compartments are situated away from the hot compartment the less they are heated. The heating is, for instance, started at six a. m., and at seven o'clock the compartments have been given the desired temperatures, as follows: The compartments 11 to 16, 60° centigrade, (the pasteurizing temperature;) 10 and 17, 57°; 9 and 18, 52°; 8 and 19, 47°; 7 and 20, 43°; 6 and 21, 39°; 5 and 22, 35°; 4 and 23, 31°; 3 and 24, 26°; 2 and 25, 23°; 1 and 26, 20°, or the temperature of the cold water. All the steam-pipes except those leading to the hottest or pasteurizing compartments are now shut. The temperatures which the different compartments have attained are also shown schematically on the first line of the table, where the respective spaces in each horizontal row represent the respective compartments 1 to 26, the figures in these spaces representing the temperatures which they have acquired at the given time. Each horizontal row represents the temperatures of the various compartments at the time represented by the corresponding figure in the first vertical row. The circles in some of the compartments indicate those compartments which contain beer. Compartment 1 is now filled with cold unpasteurized beer, the steam-pipe for compartment 11 is shut, and the pipe for compartment 17 is opened a little. The pump $c$ is set at work at such a speed that it shifts the water from one compartment to the next, as from 13 to 14, in five minutes. The water that was in compartment 14 is thereby forced into 15, the water that filled 15 is forced into 16, and so on throughout the series. The water from compartment 26 is forced through the connecting-pipe $q$ into compartment 1, the water from 1 into 2, &c., the water from 12 into 13—in short, the whole mass of water with its acquired temperatures is moved forward one compartment in the direction of the pumping. At 7.05 the temperature of the different compartments is therefore as shown by row 2 of the table. The circle in compartment 1 signifies that this compartment has been filled with beer. The compartment 2 is next filled with cold unpasteurized beer. The steam-valve to compartment 12 is closed and the valve to compartment 18 is opened. During the next five minutes the water and the temperature of all the compartments has moved one compartment farther in the direction of the pumping, (the pump constantly working at the same speed.) At 7.10 the temperature of the different compartments is therefore as shown on row 3. The beer in compartment 1 is now beginning to get warmed (23°) from the warmer water that is running into compartment 1 from 26. Compartment 3 is next filled with cold unpasteurized beer, the steam-valve to compartment 13 is closed, and the steam-valve to compartment 19 is opened a little, and during the next five minutes the water and the temperatures have again moved one compartment in the direction of the pumping. The temperatures of the different compartments at 7.15 is represented by the fourth row. In this way the filling is constantly carried out. Every five minutes the next compartment is filled with beer, and the temperature, the low as well as the high, is carried one compartment forward in the direction of the pumping. The beer in the compartments is gradually getting warmer and warmer. At 7.55 the compartment 1 has reached the highest temperature, (see row 12 on the table). The compartment 11 has been filled with cold beer. From 7.55 to 8.20 (see row 17) the temperature of compartment 1 is constantly kept at the highest temperature, whereon the cooling is commenced, the beer gradually being cooled down from the incoming colder water. At 9.10 the beer in compartment 1 has been cooled down as far as possible (20°) and is then removed. At 9.15 cold unpasteurized beer is placed in compartment 1, and the beer in compartment 2 has now been cooled down to the lowest temperature and is removed. At 9.20 cold unpasteurized beer is placed in compartment 2 and the beer in 3 has been cooled to the lowest temperature and is removed, and so on. At the same time the highest temperature is constantly moved forward one compartment every five minutes. The lowest and the highest temperatures are constantly kept diametrically opposite. The highest temperature is brought about by addition of steam. The low temperature is constantly produced by the cold unpasteurized beer which every five minutes is placed in the apparatus, and the compartments situated between the hottest and the coldest chambers contain water of intermediate temperatures.

If it is preferred to cool the beer further down before removing from the compartments and there is a sufficient supply of cold water at hand, cold water is let into the respective compartments five minutes before the beer is removed, and a corresponding amount of water is let out of the apparatus from the outlet-cock $m$ in the bottom of the compartment preceding it in the series. Suppose, for instance, that the cold water is 12°. This cold water is then at 9.05 let into compartment 1 and the cock $m$ in 26 is opened. At 9.10 the beer in 1 is then cooled to, say, 15°, and the beer is removed. The cold water is now let into compartment 2, cock $m$ in compartment 26 is closed, and cock $m$ in compartment 1 is opened. At 9.15 the beer in 2 has been cooled to 15° and is removed. The cold water is now let into compartment 3, the outlet-cock in 1 is closed, and the outlet-cock in 2 is opened, and so on throughout the series. If it is necessary to cool the beer still more before it is removed from the apparatus, a special cooling device is put into operation. This cooling device consists of a pump $d$, connected with a refrigerating-tank $l$, a water-suction hose $k$, connected with the suction end of the pump, and a delivery-water hose $n$, connected with the refrigerating-tank. (See Fig. 4.) Say, for instance, that it is desired to reduce the temperature to 5°. The hose $k$ is then at 9.05 o'clock placed in compartment 26, the pump $d$ set at work, and the discharge-hose $n$ placed in compartment 1. The water from compartment 26 is then drawn through the refrigerating-tank and there cooled down to the desired temperature (5°) and thence pumped into compartment 1. The temperature of this compartment will therefore be 5°. If the pump $d$ runs with the same speed as pump $c$, no water will pass directly from compartment 26 to compartment 1 through pipe $q$; but a volume of water equal to that received from compartment 25 will be drawn off through pipe $k$, passed through the refrigerating-tank, and thence through pipe $n$ into compartment 1, from which point it participates in the ordinary circulation induced by the pump $c$. The beer in compartment 1 is in this way cooled down to 5°. At 9.10 the beer is removed, hose $k$ is placed in compartment 1, hose $n$ in compartment 2, and the compartment 2 will now in its turn be cooled down to the desired temperature, and so on. In this way the temperature of all the compartments is each in its turn brought down to any temperature above the freezing point that is wanted before the beer is removed.

From the description it is evident how the water, which from each compartment runs into the adjoining compartment, gradually heats the cold unpasteurized beer almost to the pasteurizing temperature. This temperature is reached by addition of a little steam and kept there for a definite time, then the steam is shut off, and the beer is again cooled down by the circulating colder water. The water is kept at the highest temperature through a certain but constantly-moving portion of the cycle, and at the diametrically opposite point of the cycle the water is constantly cooled by the cold bottles placed there every five minutes. If the water is not thereby cooled sufficiently, an extra cooling device is applied, as described.

The pipe $q$ is only a means of connection between adjacent ends of the tanks, while the pump $c$ is the means of circulation. The pipe $q$ may be omitted and the whole apparatus built as one tank A, the opposite ends of the tank being connected through the pump $c$. (See Fig. 3.) The apparatus can also be built as several tanks A B C D, as shown in Fig. 5, two and two of the tanks being connected through the connecting-pipes $q\ q'\ q''$, while only the first and the last compartments of the system are connected through the circulation-pump c. There are many other ways in which the mechanical arrangement of the parts may be varied without changing the essential character of the device. I do not, therefore, wish to be understood as limiting my invention to the exact apparatus and arrangement of parts shown and described.

What I claim is—

1. An apparatus for pasteurizing beer and other bottled liquids comprising a number of fluid-containing compartments connected together in series for circulation of their fluid contents, means for separately heating the fluid in each of said compartments, means for cooling such compartments as described and means for producing a circulation of the fluid contents of said compartments throughout the series.

2. An apparatus for pasteurizing beer comprising a number of tanks having cross-partitions alternately stopping short of the top and bottom of the tank, a water-circulating connection placing the various compartments thus formed in series, a steam-supply pipe having a branch entering each compartment, a controlling-valve for each branch and means for supplying cooling-water to any of the compartments.

3. An apparatus for pasteurizing beer comprising a number of tanks having cross-partitions alternately stopping short of the top and bottom of the tank, a water-circulating connection placing the various compartments thus formed in series, means for supplying heat independently to each of the compartments at will, a refrigerating-tank and a water-circulating mechanism adapted to draw water from and deliver water to each of the compartments at will.

4. An apparatus for pasteurizing beer comprising a number of tanks having cross-partitions alternately stopping short of the top and bottom of the tank, a permanent water-circulating connection between adjacent end compartments of the tanks, a steam-supply pipe extending alongside each tank, branch pipes extending from the steam-supply pipes into each compartment, a valve for each branch pipe and means for drawing warm water from and supplying cold water to each compartment.

In witness whereof I have hereunto set my hand in presence of two witnesses.

NIELS FREDERIK NISSEN.

Witnesses:
C. Fox Mauts,
Magnus Jensen.